Figure 1:
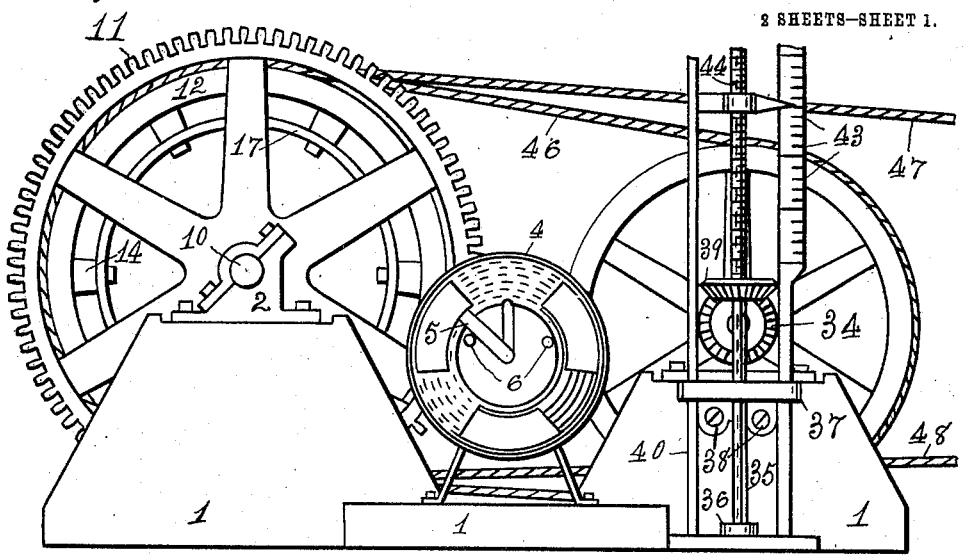

F. H. ARMSTRONG.
POWER TRANSMISSION MECHANISM.
APPLICATION FILED MAR. 4, 1911.

997,031.

Patented July 4, 1911.

2 SHEETS—SHEET 1.

WITNESSES:
E. M. Albee.
E. M. Briggs.

INVENTOR.
Frank H. Armstrong
BY
G. H. Albee
ATTORNEY.

F. H. ARMSTRONG.
POWER TRANSMISSION MECHANISM.
APPLICATION FILED MAR. 4, 1911.
997,031.
Patented July 4, 1911.
2 SHEETS—SHEET 2.
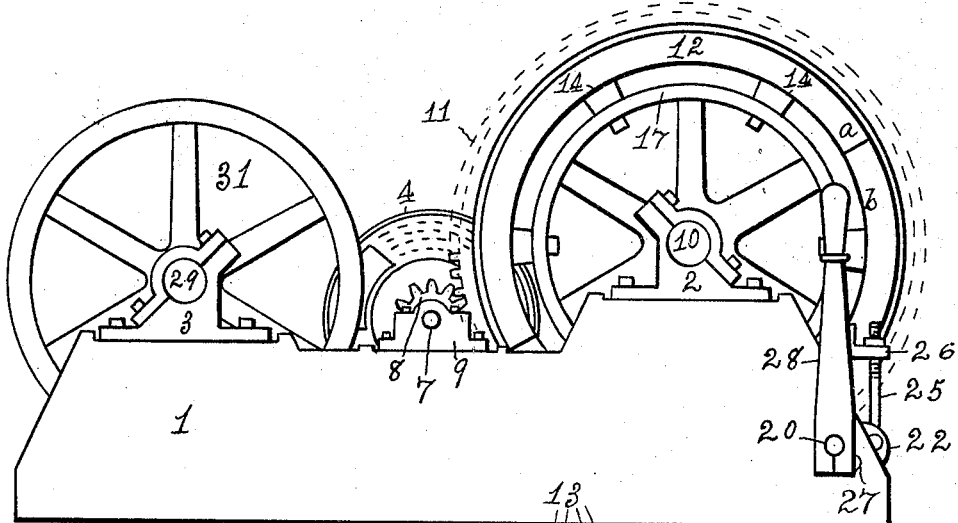
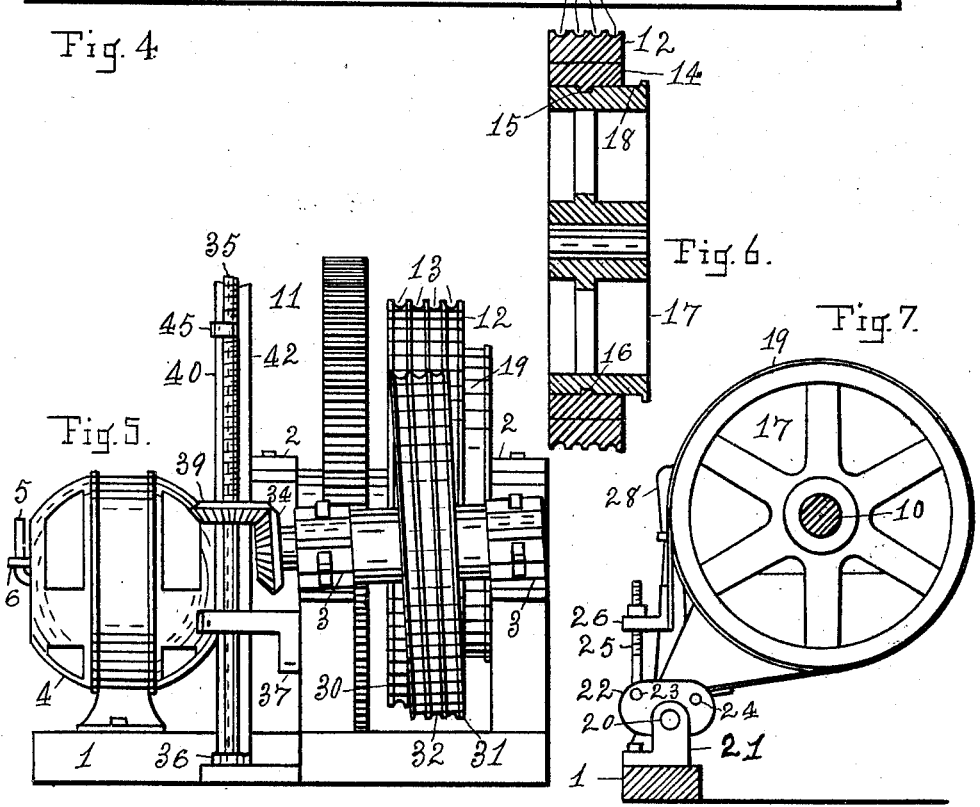
WITNESSES:
C. M. Albee
E. M. Briggs
INVENTOR.
Frank H. Armstrong
BY G. H. Albee
ATTORNEY.

UNITED STATES PATENT OFFICE.

FRANK HALL ARMSTRONG, OF VULCAN, MICHIGAN, ASSIGNOR TO C. A. LAWTON COMPANY, OF DE PERE, WISCONSIN.

POWER-TRANSMISSION MECHANISM.

997,031. Specification of Letters Patent. Patented July 4, 1911.

Application filed March 4, 1911. Serial No. 612,245.

*To all whom it may concern:*

Be it known that I, FRANK H. ARMSTRONG, a citizen of the United States, residing at Vulcan, in the county of Menominee and State of Michigan, have invented a new and useful Power-Transmission Mechanism, of which the following is a specification.

My invention relates to a rope transmission device adapted for moving a car or cars along a track for a limited distance in either direction, such cars and tracks as are used in mining operations, and is consists of a heavy cast metal frame for supporting the mechanism, a motor of some description mounted upon the frame, no particular type of motor is claimed, it may be electric, steam, compressed air, gasolene, or such kind as is most conveniently supplied with the motive power agent in the locality where it is to be used.
It should be provided with means, such as a switch lever of an electrical motor, for instance, for quickly starting, stopping and reversing the running direction of the motor. A main driving shaft is journaled upon the frame and is arranged to be revolved by said motor, a pinion is secured upon said driving shaft, a counter shaft is journaled for revolution upon the frame having a gear wheel in mesh with said pinion, a pulley rim mounted thereon having a plurality of rope grooves in its face, and which acts as the driving pulley for the rope power transmission, a brake device for checking and assisting in stopping the revolutions of said driving pulley. A second counter shaft having a rope pulley thereon is journaled upon the frame in a vertical plane parallel with the vertical plane of the driving pulley shaft but in a horizontal plane is at an angle with it such that the rope groove in a pulley thereon, while in the vertical plane of a rope groove upon the driving pulley at its lower side, is in the vertical plane upon its upper side of the groove in said driving pulley next adjoining, for allowing the rope to run around the pulleys upon the two shafts in a straight line from one pulley to the other, with no tendency to bind or produce unnecessary friction along the sides of said grooves. The rope grooved face of the driving pulley is formed in two ring like sections for the purpose of easily and cheaply renewing said pulley face as the grooves become worn too much for effective service. Still another convenient attachment is an indicating device for showing the position of the cars or whatever is being drawn by the ropes along the track by means of the amount of the free ends of the rope which may have been run off at any time during its operation, and the object of my improvements is, to provide a compact mechanism, one of great rope transmission power, with the smallest frictional wear of the rope and driving pulley, and one in which the parts most likely to become worn can be quickly renewed with a small delay and expense.

My invention is shown in the accompanying drawing, in which,—

Figure 3:
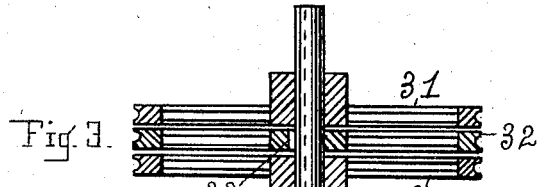
Figure 2:
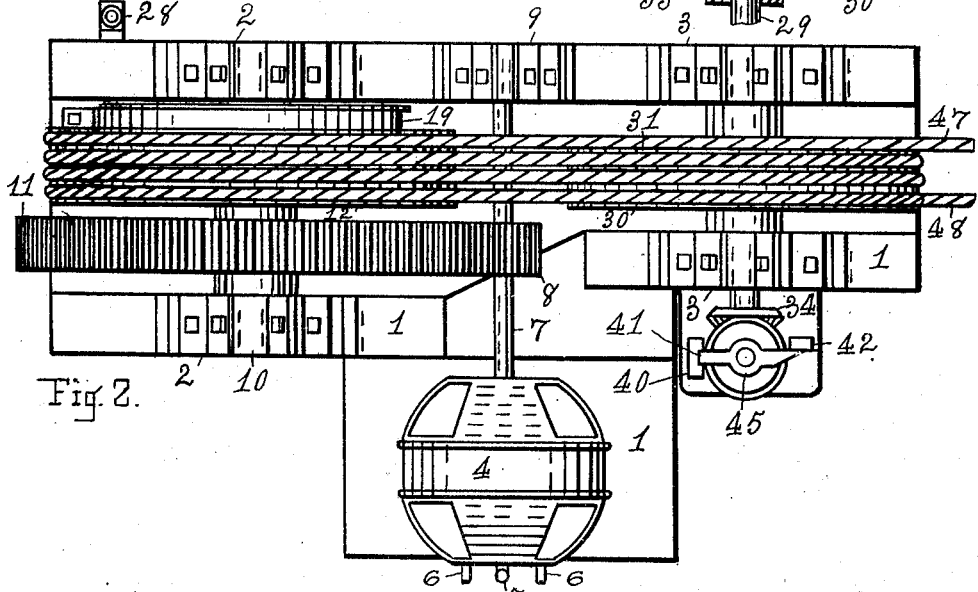

Figure 1 is a side elevation of the mechanism. Fig. 2 is a plan of Fig. 1. Fig. 3 is a cross section of its loose or idler pulley. Fig. 4 is a side elevation showing the opposite side from that shown in Fig. 1. Fig. 5 is an end elevation of the left hand end of Fig. 4. Fig. 6 is a vertical section of the driving pulley and the brake pulley. Fig. 7 is a side elevation showing the brake pulley and its operating mechanism as seen from the inside of the frame of the machine.

Similar numerals and letters indicate like parts in the several views.

1, indicates the frame or bed piece of the machine for supporting the mechanism; 2 and 3, journal boxes mounted upon the frame and bolted to it; 4, an electric motor bolted to the base of the frame; 5, a switch lever for controlling its operation; 6, the switch lever stop pins; 7, the main driving shaft which is driven by the motor; 8, a pinion secured upon the main shaft; 9, a journal box bolted to the frame and carrying one end of the driving shaft, its other end being supported by the motor; 10, a counter shaft mounted for revolution in journal boxes 2; 11, a gear wheel secured upon the shaft 10 and engaging with the pinion 8. As in the use of wire ropes in grooves around a pulley there will always be more or less slipping of the rope, its grooves when continually used soon become worn to such an extent as to require renewal of the pulley rim. For facilitating its renewal, I form the rim in two ring like sections which are accurately fitted upon the rim of a smaller pulley, as will be described.

12, indicates a pulley rim formed in two sections, a and b, provided upon their faces with a plurality of rope grooves 13, and upon their inner side with bosses 14, having a tongue 15, for fitting a groove 16, in the face of the pulley 17, one end of which, 18, serves as a brake surface for a resilient band 19, the pulley 17, being secured upon the shaft 10. These ring sections a and b, may have the tongues 15, formed upon the inside of the rims and dispense with the bosses 14 if desired, but its large diameter can be obtained with less weight of metal if the bosses are formed, while the brake pulley 17, is as large in diameter as is required for its braking capacity. A shaft 20, is journaled in the side of the frame 1, and a journal box 21, (see Fig. 7,) is arranged on the base of the frame and having mounted upon the shaft 20, an eccentric 22, to which is connected by pins 23 and 24, the two ends of the brake band 19, one end of the band being provided with a threaded rod 25, which is engaged with the angle iron 26 that is attached to the brake band. Upon the outer end of the shaft 20, is clamped by means of the screw bolt 27, an operating lever, 28. By swinging the upper end of the lever to the right in Fig. 4, left in Fig. 5, the revolutions of the shaft 10 can be checked.

Arranged for revolution in the journal boxes 3, is a second counter shaft 29, said shaft being at such an angle horizontally, with the shaft 10, that the several rope grooved pulleys thereon, will have their rope grooves at the upper surface thrown over from the vertical plane of the grooves in the pulley face 12, to the next adjoining groove, in the present case to the adjoining groove upon its left, (see Fig. 5,) whereby the rope as it runs from the lower face of the pulley 12, will run straight to the groove in the lower face of the pulley upon the shaft 29, thence in a slanting direction, so that its groove upon the upper face of the pulley will be in a position for the rope to run straight on to the next adjoining groove at the left, of the pulley 12.

The two grooved pulleys 30 and 31, are mounted loosely upon the shaft 29, and the pulley 32, is secured to the shaft, as by the key 33. (See Fig. 3.) One end of the shaft extends outward and is provided with a bevel gear wheel 34. Near this gear wheel a shaft 35, is arranged for revolution in the step box 36 and bracket arm 37, the arm being secured to the frame 1 with screws 38. Secured to the shaft 35, is a gear wheel 39, in mesh with the wheel 34, by means of which the shaft 35 is revolved at a rate which is governed by the revolutions of the pulley 32. At suitable points near the shaft 35, a bar 40, provided with a groove 41, and a bar 42, provided with scale marks 43, is erected, they being held in position upon the base of the frame and arm 37. The shaft 35 is provided with screw threads 44, above the gear wheel 39, and with a nut 45, one end of the nut entering the groove 41, the other end being pointed for indicating its position with reference to the scale marks 43. The motor is permitted to run only a limited number of revolutions in either direction, which number is governed by the length of rope 46, whose ends 47 and 48, extend outward from the outer grooves 13, in the pulley sections a and b, to any required distance. The shaft 35 can turn only a limited number of times in either direction and the position of the pointer relative to the scale marks will indicate the position of the car being drawn by the rope ends 47 and 48. In using the mechanism, a wire or other rope is wound around the pulleys upon the two shafts within the several rope grooves, which grooves may be more or less than is here shown, but the driving pulley upon the first named counter shaft must always have one more groove for a rope than there are in all of the pulleys upon the second named counter shaft.

In arranging the rope upon the machine, it is to be first wound around the right hand groove in the pulley 12 from its upper side, thence from its lower side run to the lower side of the pulley 31, upon the shaft 29, and upward and along its groove to the next inner groove in the pulley 12 and around it and back around the groove in the pulley 32, and then to the pulley 12 and around its third inner groove, back to and around the pulley 30, and to the fourth groove in the pulley 12, and backward alongside of the pulley 30, its two free ends then to extend to any desired distance, and one of them passed around a loose pulley which is suitably supported, and back to the other end of the rope, or to the object to be drawn, to which it is to be connected. This last named loose pulley may be arranged for taking up any slack in the rope, if desired. This last named loose pulley, the car to be moved and its track, are not shown, as they are no part of this invention.

It should be observed that the lever 5 upon the motor when in a vertical position allows the motor to be at rest. Upon its being swung over against the pin 6 at one side the motor will revolve the driving shaft in one direction, and upon swinging it down against the pin at the other side, it will revolve it in the opposite direction.

Having described my invention, what I claim and desire to secure by Letters Patent, is,—

1. A power transmission mechanism, comprising a suitable frame for supporting the mechanism, a motor mounted upon said frame, means for quickly starting, stopping and reversing the running direction of the motor, a main driving shaft suitably supported upon said frame and adapted to be revolved by said motor, a pinion secured upon said shaft, a counter shaft arranged for revolution in suitable journal boxes upon said frame, a gear wheel secured thereon and in mesh with said pinion, a main driving pulley secured upon said counter shaft, a plurality of rope grooves around the face of the rim of said driving pulley, a brake pulley rim arranged at one end of said driving pulley rim, a resilient band around a portion of the circumference of said brake pulley rim, a lever arranged for operating said brake band, a second counter shaft arranged for revolution in suitable journal boxes upon said frame in a vertical plane parallel with the vertical plane of said first named counter shaft and at an angle therewith horizontally, a single groove rope pulley mounted for revolution upon said second counter shaft, the plane of its rope groove upon its lower side being in the vertical plane of a rope groove upon the main driving pulley, while upon its upper side, it is in the vertical plane of a groove upon the main driving pulley next adjoining the groove that the lower side as in the plane of, and a rope wound arond the main driving and single groove pulley with its free ends extending from the grooves upon the upper and lower surface of the rim of said main driving pulley.

2. A power transmission mechanism, comprising a suitable frame for supporting the mechanism, a motor, means for quickly starting, stopping and reversing the running direction of the motor, a main driving shaft suitably supported upon the frame and arranged to be revolved by said motor, a pinion secured upon said shaft, a counter shaft arranged for revolution in suitable journal boxes upon said frame, a gear wheel secured thereon and in mesh with said pinion, a main driving pulley rim mounted upon said counter shaft, a plurality of rope grooves around the face of said pulley rim, a brake pulley rim arranged upon said counter shaft, means for applying a braking device for said shaft, a second counter shaft arranged for revolution in suitable bearings upon said frame in a vertical plane parallel with the vertical plane of said first named counter shaft, and at an angle therewith horizontally, three single groove rope pulleys mounted upon said shaft, one of them secured thereto, and the others loose thereon, the planes of their rope grooves being in the vertical planes upon their lower sides of a like number of rope grooves upon the driving pulley, while upon their upper sides they are in the vertical planes of the grooves in said driving pulley next adjoining the respective grooves which their lower sides are in the planes of, and a rope around the grooves of the pulleys of the two counter shafts, commencing at a groove upon the upper or lower side of the main driving pulley near one end thereof and ending at the opposite side of the pulley face near its other end, its free ends extending from the driving pulley to any required distance.

3. In a power transmission mechanism, consisting of a suitable frame, a motor having means for starting, stopping and reversing its running direction, mounted upon the frame, a main driving shaft driven by said motor, a counter shaft suitably journaled upon said frame, suitable gearing operated by said main shaft for driving said counter shaft, a main driving pulley revoluble with said counter shaft, a plurality of rope grooves in the face of said driving pulley, braking means for checking its revolutions, a second counter shaft arranged in a vertical plane which is parallel with the axial line of said first named counter shaft, a rope grooved pulley secured upon said second named counter shaft, a rope arranged for running around the pulleys upon the two counter shafts and its free ends extended from the grooves of the driving shaft to any required distance, the combination therewith of a device for indicating the length of rope which may have been run off from said driving pulley at any time during its use, at either end thereof, consisting of a gear wheel upon one end of said second named counter shaft, a vertical shaft suitably journaled upon the frame, a gear wheel thereon, in mesh with the first named gear wheel, threads upon a portion of the length of said vertical shaft, a nut threaded thereto, a guide for the movement of said nut in a plane parallel with said vertical shaft, a scale of spaces arranged parallel with the vertical movement of said nut, and a pointer extending outward from said nut and near said scale spaces.

4. In a power transmission mechanism in which power is transmitted by means of a wire rope running around in grooves in a metallic faced pulley, and having means for the application of a brake for controlling the rate of speed of its revolutions, the combination of a brake pulley adapted to be secured upon a shaft, a straight face across the rim of said pulley of a width greater than is required for the number of grooves around the pulley face to be mounted thereon, a groove formed around the brake pulley face, two semicircular ring sections fitted to the circumference of said brake pulley at one end thereof, its other end extending beyond the end of the ring section sides, and having space for a brake device thereon, a tongue upon each ring section adapted for fitting said groove around the brake pulley face, a plurality of bolts for connecting said brake pulley rim and ring sections, a resilient band arranged around a portion of the circumference of the extending end of said brake pulley, means for tightening said band for checking the speed of said brake pulley, and a plurality of rope grooves in the outer face of said ring sections.

FRANK HALL ARMSTRONG.

Witnesses:
WM. STANAWAY,
WILLIAM KELLY.